United States Patent [19]

Nagasaki et al.

[11] Patent Number: 4,608,490

[45] Date of Patent: Aug. 26, 1986

[54] FOCUS DETECTION METHOD UTILIZING SURFACE ACOUSTIC WAVE

[75] Inventors: Tatsuo Nagasaki, Musashino; Junichi Nakamura, Hachioji, both of Japan

[73] Assignee: Olympus Optical Company Limited, Tokyo, Japan

[21] Appl. No.: 552,426

[22] Filed: Nov. 16, 1983

[30] Foreign Application Priority Data

Nov. 22, 1982 [JP] Japan .............................. 57-205026
Nov. 22, 1982 [JP] Japan .............................. 57-205028
Nov. 22, 1982 [JP] Japan .............................. 57-205029
Nov. 22, 1982 [JP] Japan .............................. 57-205030

[51] Int. Cl.⁴ .............................................. G01J 1/20
[52] U.S. Cl. ..................................... 250/201; 354/406
[58] Field of Search ................ 350/358; 250/201, 204, 250/208, 209, 216; 354/403-408

[56] References Cited

U.S. PATENT DOCUMENTS 4,457,621 7/1984 Harris et al. ...................... 350/358

Primary Examiner—David C. Nelms
Attorney, Agent, or Firm—Parkhurst & Oliff

[57] ABSTRACT

Method for detecting a focus condition of an imaging optical system by using a surface acoustic wave device is disclosed. A light receiving element array formed by a plurality of light receiving elements receives a light flux transmitted through at least a part of an image formed by the imaging optical system. Then, outputs of said light receiving elements are processed on real time by means of a Fourier transform device including a surface acoustic wave device, a convolver, etc. so as to derive an image sharpness and/or an image lateral shift, both of which are used for a focus detection. Therefore, as compared with a conventional focus detection method, it is possible to perform the focus detection in a fast and accurate manner by a simple and small construction.

21 Claims, 17 Drawing Figures $g(x) = f(x+\Delta x) + f(x-\Delta x)$

FOCUS DETECTION METHOD UTILIZING SURFACE ACOUSTIC WAVE

BACKGROUND OF THE INVENTION

The present invention relates generally to a method for detecting a focus condition for use in optical devices such as a camera and microscope, and more particularly to a focus detection method which utilizes a surface acoustic wave device for effecting a Fourier transform on real time.

As to a method for detecting the focus condition of an imaging optical system, there has been proposed a method for detecting an image sharpness by Fourier-transforming an image signal and comparing its spatial frequency component. In this method, a part of the image of an object is transformed into a time-frequency series by a solid state line sensor, and then the Fourier transform is performed for the thus transformed image. After that, an amount of integrated high frequency components thereof is compared with a predetermined value so as to derive a signal representing a focus condition. However, in the focus detection method mentioned above, since the Fourier transform can not be effected on real time, only a simple pseudo Fourier transform is effected by means of a so-called contrast echo method. Therefore, according to the method mentioned above, a detection accuracy is low and a detection error occurs largely. In this case, it is possible to use a fast Fourier transform device for effecting the Fourier transform after converting the outputs of the line sensors into digital values. However, even if the Fourier transform can be effected in a few hundred ms, the whole apparatus is made large in size and expensive in cost, and thus it is not possible to accommodate it in a small space of an optical machine such as a camera.

As to the other focus detection method, there has been proposed a method that two images formed by two light fluxes passing through two different regions of an exit pupil of the imaging lens are received respectively by two light receiving element arrays each comprising a plurality of light receiving elements, and then a correlation between images formed on the two light receiving element arrays i.e. a lateral shift of the two images is detected so as to derive the focus condition. However, in this known method, since the correlation of the images is detected by calculating image signals according to a predetermined algorithm after converting outputs of the two light receiving element arrays into digital values, the calculation requires an extremely long time period and thus the focus information is not obtained quickly.

Recently, there has been developed a surface acoustic wave device of an analog type which performs the Fourier transform or a convolution of two signals by utilizing the surface acoustic waves. Such surface acoustic wave element can perform the signal processing on real time and also can be made small to such an extent that the whole apparatus can be easily accommodated in an IC package.

Hereinafter, the surface acoustic wave element will be explained with reference to a Japanese Magazine "Television Gakkai-shi, vol. 36, No. 6 (1982), pp. 498–504".

FIG. 1A is a schematic view showing one embodiment of a chirp filter using the surface acoustic wave element. A chirp filter 1 of an interdigital type comprises a piezoelectric substrate 2 such as PZT or LiNbO$_3$, a first interdigital electrode 3 for transmitting a surface acoustic wave and a second interdigital electrode 4 for receiving the surface acoustic wave. These interdigital electrodes 3 and 4 are arranged on the substrate 2 apart from each other. The second interdigital electrode 4 has a variable pitch so that a delay time varies in proportion to the frequency of the surface acoustic wave. This chirp filter 1 can be utilized for effecting the Fourier transform.

If it is assumed that a frequency band width of an input signal is B, a length of the chirp filter 1 is l, a propagating velocity of the surface acoustic wave on the chirp filter is v and a resolution of the Fourier transform in N, the resolution N is approximated to two times a compression ratio $lB/v$ of the chirp filter 1. Therefore, a relation $l = Nv/2B$ is derived from $N = 2lB/v$. Here, if it is further assumed that the frequency band width B is 6 MHz, the piezoelectric substrate 2 is PZT and $v \approx 2,000$ m/sec, in order to attain the resolution $N = 100$, the length of the chirp filter 1 is derived as $l = 16.7$ mm from the equation mentioned above and this dimension is extremely small. In addition, since a time period t required for effecting the Fourier transform is equal to a period during which the signal wave travels across the chirp filter 1, and this time period t is made extremely small because t is calculated as $t = l/v \approx 8.4$ μs, and thus it is possible to effect the Fourier transform on real time. In the calculation mentioned above, use is made of the assumption of $N = 100$ wherein a spectrum band of the Fourier transform is divided into 100 regions, but it is possible to effect the focus detection if the resolution is made lower than $N = 100$. Then, the device can be made much smaller and the Fourier transform can be performed within a shorter time. In addition, since it is possible to use a substrate having a low sonic velocity such as LiNbO$_3$ instead of the piezoelectric substrate 2, it is possible to make the dimension of the chirp filter 1 even smaller, if necessary. Moreover, it is possible to use the chirp filter of reflective-array compressor type having the variable pitch construction, and in this case the length of the chirp filter can be made one half of that of the aforementioned interdigital type.

FIGS. 1B and 1C are schematic views showing one embodiment of the Fourier transform device using a plurality of the chirp filters mentioned above. In FIG. 1B, a Fourier transform device 5 comprises two chirp filters 6-1 and 6-2 having an impulse response for an up-chirp signal wherein the frequency is increased linearly with respect to the time, and a chirp filter 7 having an impulse response for a down-chirp signal wherein the frequency is decreased linearly with respect to the time. In this Fourier transform device, an input signal and the up-chirp signal supplied from the chirp filter 6-1 are multiplied in a multiplier 8-1, and the thus multiplied signal is supplied to the chirp filter 7. Further, an output signal of the chirp filter 7 and the down-chirp signal supplied from the chirp filter 6-2 are multiplied in a multiplier 8-2. In this manner, an output signal after effecting the Fourier transform is derived. Moreover, in FIG. 1C, a Fourier transform device 9 comprises the chirp filter 6-1 generating the up-chirp signal and the chirp filter 7 generating the down-chirp signal, and as compared with the embodiment shown in FIG. 1B the chirp filter 6-2 is eliminated. As mentioned above, since the Fourier transform device is constituted of the chirp filters which utilize the surface acoustic waves, the Fourier transform can be performed accurately on real time and also the device can be made extremely small in size.

FIG. 2A is a perspective view showing one embodiment of a convolver which utilizes the surface acoustic wave devices. In FIG. 2A, a convolver 11 comprises two interdigital electrodes 13-1 and 13-2 arranged apart from each other on a piezoelectric substrate 12, a semiconductor 14 arranged on one surface of the substrate 12 substantially at a middle between these electrodes 13-1 and 13-2, and a bottom metal plate 15 arranged on the other surface of the substrate 12 opposite to the semiconductor 14. In this embodiment, the surface acoustic waves simultaneously transmitted from the two electrodes 13-1 and 13-2 in opposite directions interfere with each other due to the acoustic nonlinearity of the semiconductor 14, and thus it is possible to obtain an output signal representing the convolution of the two input signals from the semiconductor 14. In this convolver 11, if it is assumed that an interference length of the semiconductor 14 is 1.5T, and to the electrodes 13-1 and 13-2 are supplied signal waves having a band width B and time durations of 2T and T, respectively, at a timing shown in FIG. 2B, the convoluting operations for $N = B \times T$ points can be effected within the time duration of 2T as shown in FIG. 2C, and thus it is possible to derive the correlation between the two input signals.

As to the method for detecting the focus condition by utilizing the surface acoustic wave, there has been proposed a method and an apparatus in U.S. Pat. No. 4,053,934. In this known method, an image to be observed is projected onto a CdS film and at the same time the surface acoustic waves having a predetermined frequency are applied to the CdS film by means of a transducer. Then, an image sharpness is derived from the Fourier transform component corresponding to the frequency of the surface acoustic wave applied to the CdS film. In this case, since the image sharpness is derived from an average of the whole image to be observed, the detection accuracy is low, particularly for a certain kind of image. Moreover, according to the known method, it is not possible to detect the focus condition in a specific region of the image. Further, since the focus detection is performed only by the image sharpness detection method, the high detection accuracy could not be obtained for a low contrast image such as a human face.

The inventors have recognized the fact that in the known focus detection method utilizing the surface acoustic wave, the surface acoustic wave devices explained above have not be used and further that if the surface acoustic wave devices are utilized optionally, it is possible to effect the focus detection very accurately.

SUMMARY OF THE INVENTION

The present invention has for its object to eliminate the drawbacks mentioned above and to provide a method for detecting a focus condition in a fast and accurate manner by utilizing a surface acoustic wave device.

Another object of the invention is to provide a focus detection method which can be effected in a simple and inexpensive manner by utilizing the surface acoustic wave device.

Still another object of the invention is to provide a focus detection method which uses a lateral shift and/or an image sharpness technique by utilizing the surface acoustic wave device.

According to the invention, a method for detecting a focus condition of an imaging optical system comprises the steps of receiving at least a part of an image formed by an imaging optical system by means of at least one light receiving element array comprising a plurality of light receiving elements; processing outputs of said light receiving elements on real time by means of a surface acoustic wave device to produce an output signal; and detecting the focus condition of said imaging optical system from said output signal of the surface acoustic wave device.

DESCRIPTION OF THE PREFERRED EMBODIMENTS

Figure 3:
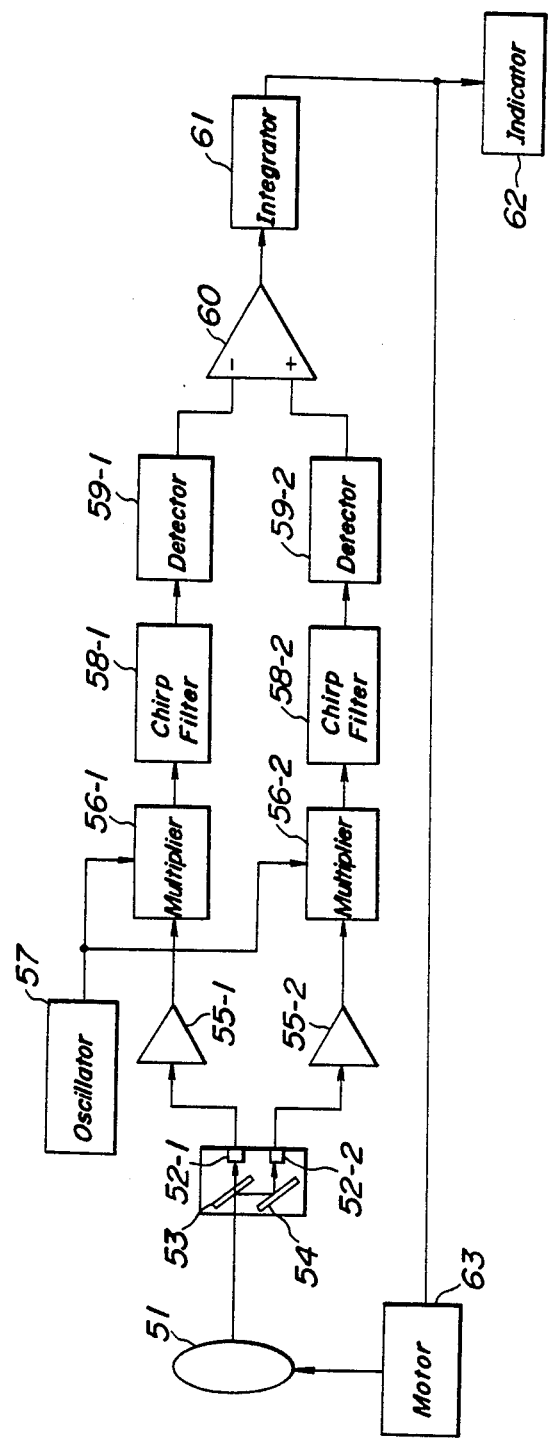
FIGS. 3, 4 and 5 are schematic views respectively illustrating one embodiment of a focus detection apparatus for effecting the method according to the invention.

FIG. 3 is a schematic view showing one embodiment of a focus detection apparatus for effecting the method according to the invention. In this embodiment, a part of an image of an object formed by an imaging optical system 51 is projected onto two line sensors 52-1 and 52-2 arranged apart from each other by the same distance with respect to a predetermined focal plane or a surface equivalent thereto. To this end, a part of a light flux transmitted through the imaging optical system 51 is divided into two light fluxes by means of a half mirror 53, so that the light flux transmitted through the half mirror 53 is made incident upon the line sensor 52-1 arranged forwardly with respect to the predetermined focal plane and the light flux reflected by the half mirror 53 is made incident upon the line sensor 52-2 arranged backwardly with respect to the predetermined focal plane via a reflection mirror 54. Output signals of the line sensors 52-1 and 52-2 are respectively read out serially and are converted into time frequencies. The converted signals are supplied to multipliers 56-1 and 56-2 through amplifiers 55-1 and 55-2, respectively, and are multiplied with an output of an oscillator 57 so as to effect an AM modulation. After that, the thus modulated signals are respectively supplied to chirp filters 58-1 and 58-2, respectively, and then Fourier transform signals wherein the frequency component thereof corresponds to the time are derived from the chirp filters 58-1 and 58-2, respectively. These two signals after effecting the Fourier transform are respectively supplied to detectors 59-1 and 59-2 so as to effect an AM demodulation. Then, respective power spectra are derived from the detectors 59-1 and 59-2 and the difference therebetween is detected by a differential amplifier 60. In this case, a polarity of an output derived from the differential amplifier 60 becomes, for example, negative in case that the imaging optical system 51 is in a forwardly de-focus condition, but becomes positive in case of a backwardly de-focus condition and becomes zero in case of an in-focus condition. Then, the output signal of the differential amplifier 60 is integrated by an integrator 61 and the thus integrated signal is supplied to an indicator 62 to indicate the focus condition and is also supplied to a motor 63 to move the imaging optical system 51 to the in-focus position automatically. In this case, it is also possible to move the imaging optical system 51 by a manual operation in accordance with an indication of the indicator 62.

In this embodiment, since the fast Fourier transform can be performed on real time for the outputs of the line sensors 52-1 and 52-2 by means of the chirp filters 58-1 and 58-2, it is possible to detect the focus condition always in a highly accurate manner without causing detection errors. Moreover, since the chirp filters 58-1 and 58-2 can be made small in size and the outputs of the line sensors 52-1 and 52-2 are supplied to the chirp filters 58-1 and 58-2 without converting them into digital signals after effecting the time frequency conversion and the amplitude modulation, the whole apparatus can be made small in size, inexpensive in cost and simple in construction.

Figure 4:
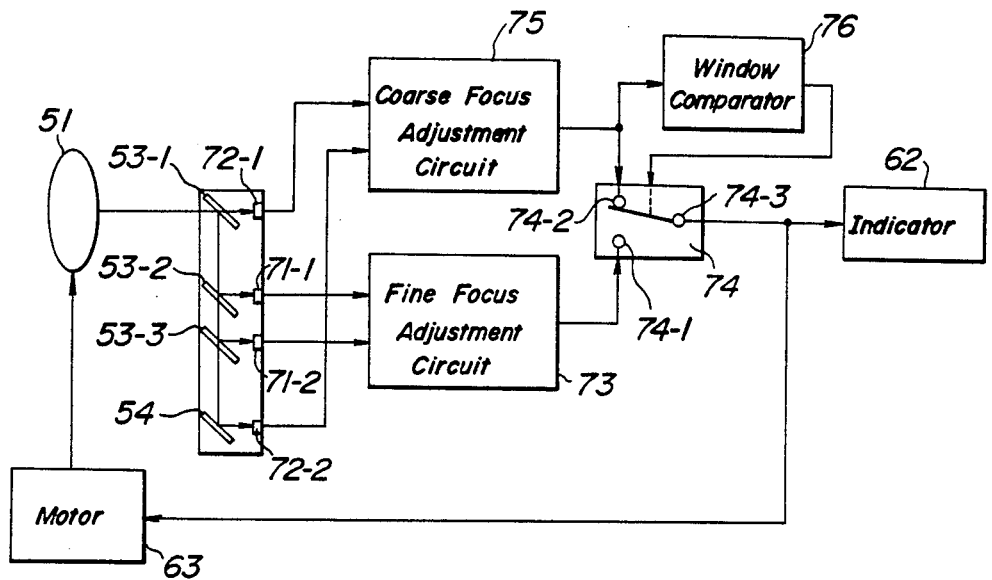

FIG. 4 is a schematic view showing another embodiment of the focus detection apparatus for effecting the method according to the invention. In this embodiment, a part of the image formed by the imaging optical system 51 is projected onto two pairs of line sensors 71-1, 71-2; 72-1, 72-2 arranged apart from each other by the same distance forward and backward with respect to the predetermined focal plane. That is to say, one pair of line sensors 71-1 and 71-2 for effecting a fine focus adjustment are arranged apart from each other by a relatively small distance, while the other pair of line sensors 72-1 and 72-2 for effecting a coarse focus adjustment are arranged apart from each other by a relatively large distance. Further, a part of the light flux transmitted through the imaging optical system 51 is made incident upon the line sensor 72-1 through a half mirror 53-1, and the light flux reflected by the half mirror 53-1 is introduced into a half mirror 53-2. Then, the light flux reflected by the half mirror 53-2 is made incident upon the line sensor 71-1, and the light flux transmitted through the half mirror 53-2 is further introduced into a half mirror 53-3. The light flux reflected by the half mirror 53-3 is made incident upon the line sensor 71-2, and also the light flux transmitted through the half mirror 53-3 is made incident upon the line sensor 72-2 via a reflection mirror 54. The outputs of the line sensors 71-1 and 71-2 are supplied to a fine focus adjustment circuit 73 having the same construction as that shown in FIG. 3 and comprising the amplifiers 55-1, 55-2, the multipliers 56-1, 56-2, the oscillator 57, the chirp filters 58-1, 58-2, the detectors 59-1, 59-2, the differential amplifier 60 and the integrator 61. Further, the output of the fine focus adjustment circuit 73 i.e. the output of the integrator 61 is supplied to one input terminal 74-1 of a switch 74. In addition, the outputs of the line sensors 72-1 and 72-2 are supplied to a coarse focus adjustment circuit 75 having the same construction as that of the fine focus adjustment circuit 73, and further the output of the coarse focus adjustment circuit 75 is supplied to the other input terminal 74-2 of the switch 74 and also to a window comparator 76. Under the control of the window comparator 76, an output terminal 74-3 of the switch 74 is connected to the input terminal 74-2 when the output of the coarse focus adjustment circuit 75 is out of a range predetermined in the window comparator 76, and also the output terminal 74-3 is connected to the input terminal 74-1 when the output of the coarse focus adjustment circuit 75 is within the predetermind range. Therefore, the focus condition is indicated on the indicator 62 in response to the output of the coarse focus adjustment circuit 75 and the imaging optical system 51 is driven accordingly by means of a motor 63, until the output thereof becomes within the range predetermined in the window comparator 76. Then, if the output of the coarse focus adjustment circuit 75 becomes within the range mentioned above, more precise focus adjustment is effected by the fine focus adjustment circuit 73. In this manner, since the line sensors for the coarse focus adjustment and the fine focus adjustment are arranged respectively for effecting the focus controlling operation, it is possible to improve the response speed and a signal to noise ratio to a great extent.

Figure 1A:
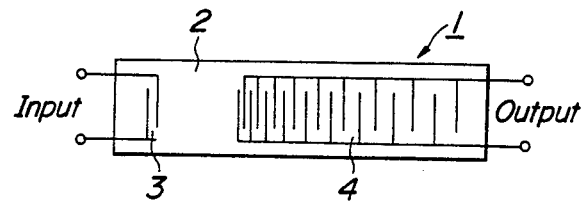
FIG. 1A is a schematic view showing one embodiment of a chirp filter using a surface acoustic wave element.
Figure 1B:
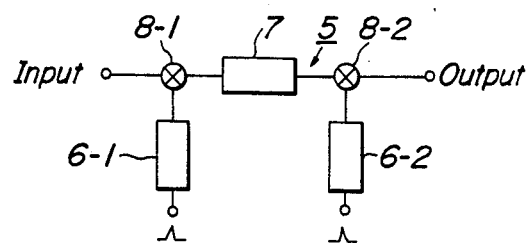
FIGS. 1B and 1C are schematic views illustrating one embodiment of a Fourier transform device using a plurality of chirp filters.
Figure 1C:
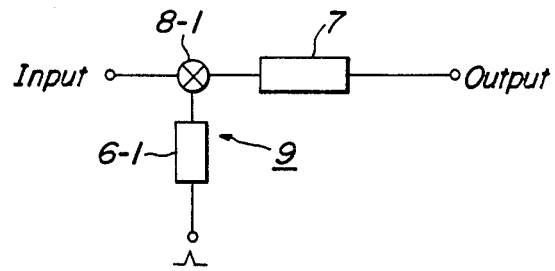

In the embodiments explained above, the Fourier transform is performed by supplying respective time series signals of the two line sensors to the chirp filters after effecting the AM modulation, but it is also possible to perform the Fourier transform by supplying directly respective time series signals to the Fourier transform devices shown in FIGS. 1B and 1C. Moreover, in the above embodiments, the outputs of the two line sensors are used respectively for effecting the Fourier transform and the focus condition is derived from the image sharpness obtained by comparing the power spectrum therebetween. However, according to the invention use may be made of only one line sensor. In such a case the focus condition can be derived from the image sharpness by comparing the power spectra at successive detection positions.

Figure 5:
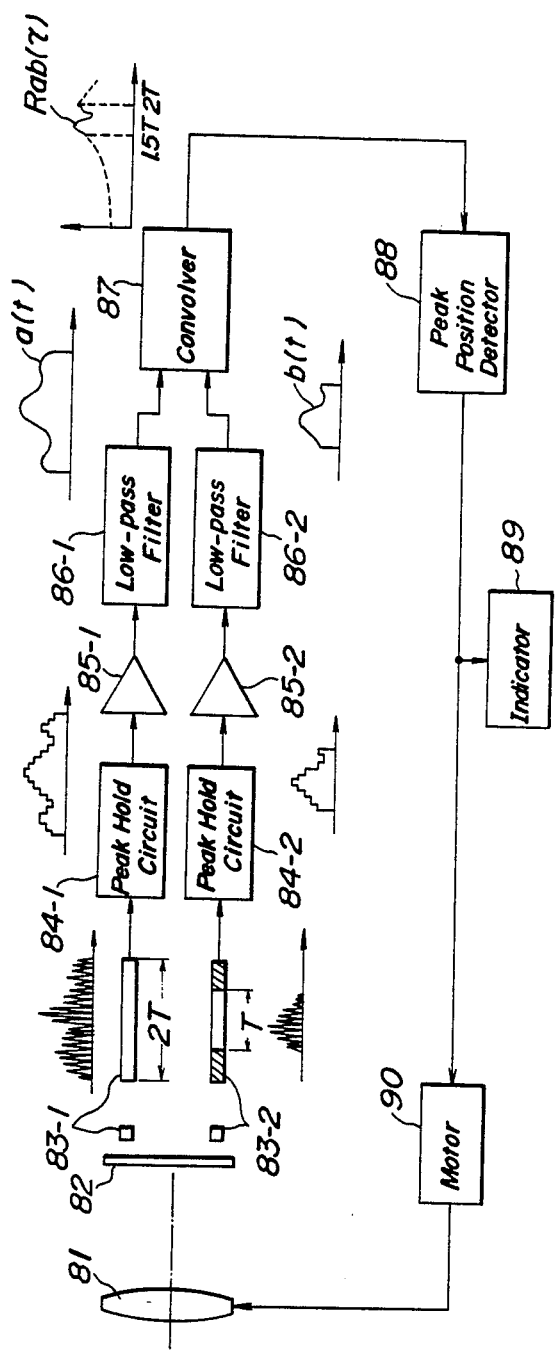

FIG. 5 is a schematic view showing still another embodiment of the focus detection apparatus for effecting the method according to the invention. In this embodiment, an exit pupil of an imaging optical system 81 is divided into a first region and a second region which are arranged symmetrically with respect to an optical axis by means of a pupil dividing means 82 such as a fly-eye lens array, a slit array and a prism array, and the light fluxes transmitted through the first and the second regions are made incident upon line sensors 83-1 and 83-2, respectively. Therefore, the images formed on the line sensors 83-1 and 83-2 are made identical with each other in the in-focus condition and are laterally shifted with each other in the de-focus condition.

In the line sensors 83-1 and 83-2, successive light receiving elements arranged in one line sensor receive alternately the light fluxes transmitted through the first and the second regions by means of the pupil dividing means 82. As to an optical system including the half mirror and the pupil dividing means, etc., use is made of the optical system disclosed in U.S. Patent Application Ser. No. 504,063 filed on June 14, 1983, now U.S. Pat. No. 4,531,835 which can also be applied to the embodiment explained hereinafter.

Figure 2A:
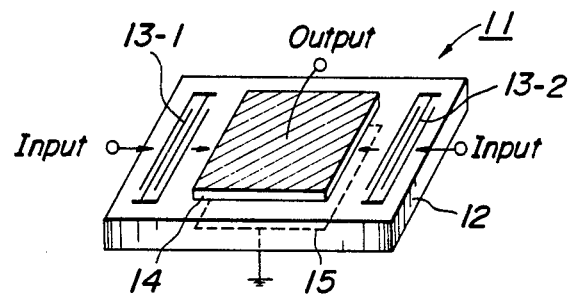
FIG. 2A is a perspective view showing one embodiment of a convolver which utilizes the surface acoustic wave devices.
Figure 2B:
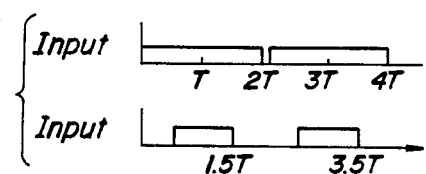
FIG. 2B is a timing chart depicting input signals of the convolver shown in FIG. 2A.
Figure 2C:
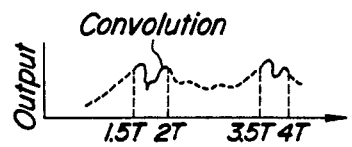
FIG. 2C is a timing chart showing an output signal of the convolver shown in FIG. 2A.

As shown in FIG. 5 by a plan view, the line sensors 83-1 and 83-2 generate the time series signals in such a manner that, if it is assumed that the time duration of the time series signals derived from one line sensor 83-1 is 2T, that of the other line sensor 83-2 becomes T at a timing shown in FIG. 2B. The time series signals thus derived are respectively supplied to a convolver 87 which utilizes the surface acoustic waves and have the interference length of 1.5T through peak hold circuits 84-1, 84-2, amplifiers 85-1, 85-2 and low-pass filters 86-1, 86-2. Futher, an output of the convolver 87 is supplied to a peak position detector 88.

Now, it is assumed that outputs a(t), b(t) of the low-pass filters 86-1 and 86-2 are described as follows:

$$a(t) = f(t - t_0) \quad 0 < t < 2T$$
$$b(t) = f(t + t_0) \quad T/2 < t < 3/2T.$$

where f(t) represents the intensity distribution of the image and $t_0$ corresponds to a lateral shift amount $x_0$ between the images formed on the line sensors 83-1 and 83-2. In this case, the output of the convolver 87 $R_{ab}(\tau)$ is described as follows:

$$R_{ab}(\tau) = \int a(t)b(\tau+t)dt = \int f(t-t_0)f(\tau+t+t_0)dt.$$

Figure 6:
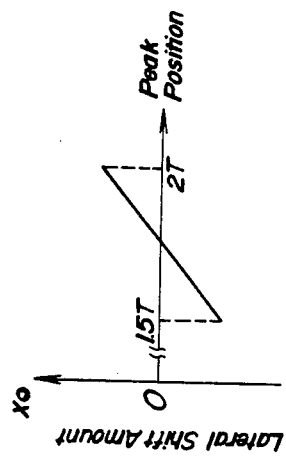
FIG. 6 is a graph for explaining operation of the focus detection apparatus shown in FIG. 5.

Therefore, in response to the $t_0$ corresponding to the lateral shift amount $x_0$, the peak position of $R_{ab}(\tau)$ can be determined. As shown in FIG. 6, the peak position is varied linearly corresponding to the lateral shift amount and direction, and appears in a range from 1.5T to 2T in the in-focus condition i.e. $x_0=0$. Therefore, since an output of the peak position detector 88 becomes zero in the in-focus condition and, in the de-focus condition, the signal having a polarity corresponding to the shift direction and a value corresponding to the shift amount, it is possible to indicate the focus condition by supplying this output to an indicator 89 and a motor 90 and also to move automatically the imaging optical system 81 into the in-focus position. In this case, the moving operation of the imaging optical system 81 may be performed manually with reference to the indication on the indicator 89.

Figure 7:
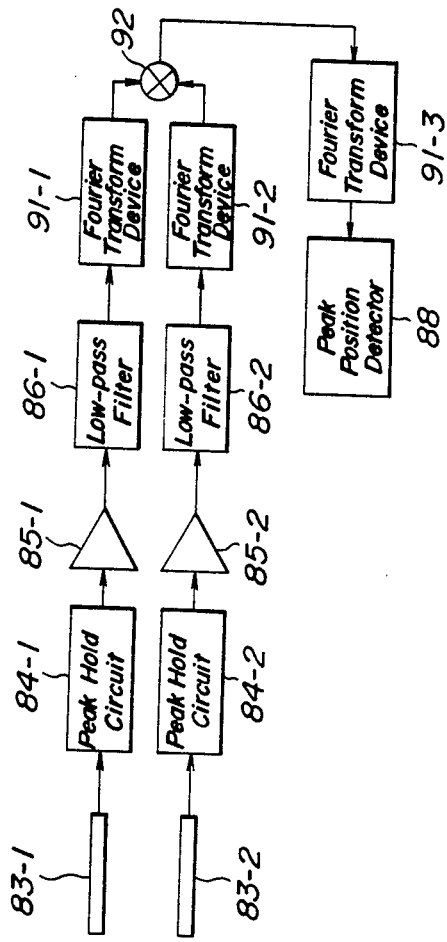
FIGS. 7, 8, 9, 10 and 11 are schematic views respectively showing other embodiment of the focus detection apparatus for effecting the method according to the invention.

FIG. 7 is a schematic view showing still another embodiment of the focus detection apparatus for effecting the method according to the invention. In this embodiment, outputs of the line sensors 83-1 and 83-2 which receive respectively the light fluxes transmitted through the different regions of the exit pupil of the imaging optical system are read out simultaneously in parallel in the time series manner. The time series signals of these line sensors 83-1 and 83-2 are supplied to Fourier transform devices 91-1 and 91-2 comprising the chirp filters as shown in FIG. 1B through the peak hold circuits 84-1, 84-2, the amplifiers 85-1, 85-2, and the low-pass filters 86-1, 86-2 so as to effect the Fourier transform. Then, these transformed signals are multiplied in a multiplier 92, and the thus multiplied signal is supplied to the peak position detector 88 through a Fourier transform device 91-3.

In this embodiment, the cross spectrum of the image can be derived from the outputs of the line sensors 83-1 and 83-2 by calculating them respectively in the Fourier transform devices 91-1, 91-2 and the multiplier 92, and thus as is the same as the embodiment shown in FIG. 5 it is possible to obtain the correlation function by effecting the Fourier transform of this cross spectrum in the Fourier transform device 91-3. Therefore, if the peak position of the correlation function is detected by the peak position detector 88, it is possible to obtain the focus information including a signal that becomes zero in the in-focus condition and in the de-focus condition has a polarity corresponding to the shift direction and a value corresponding to the shift amount.

Figure 8:
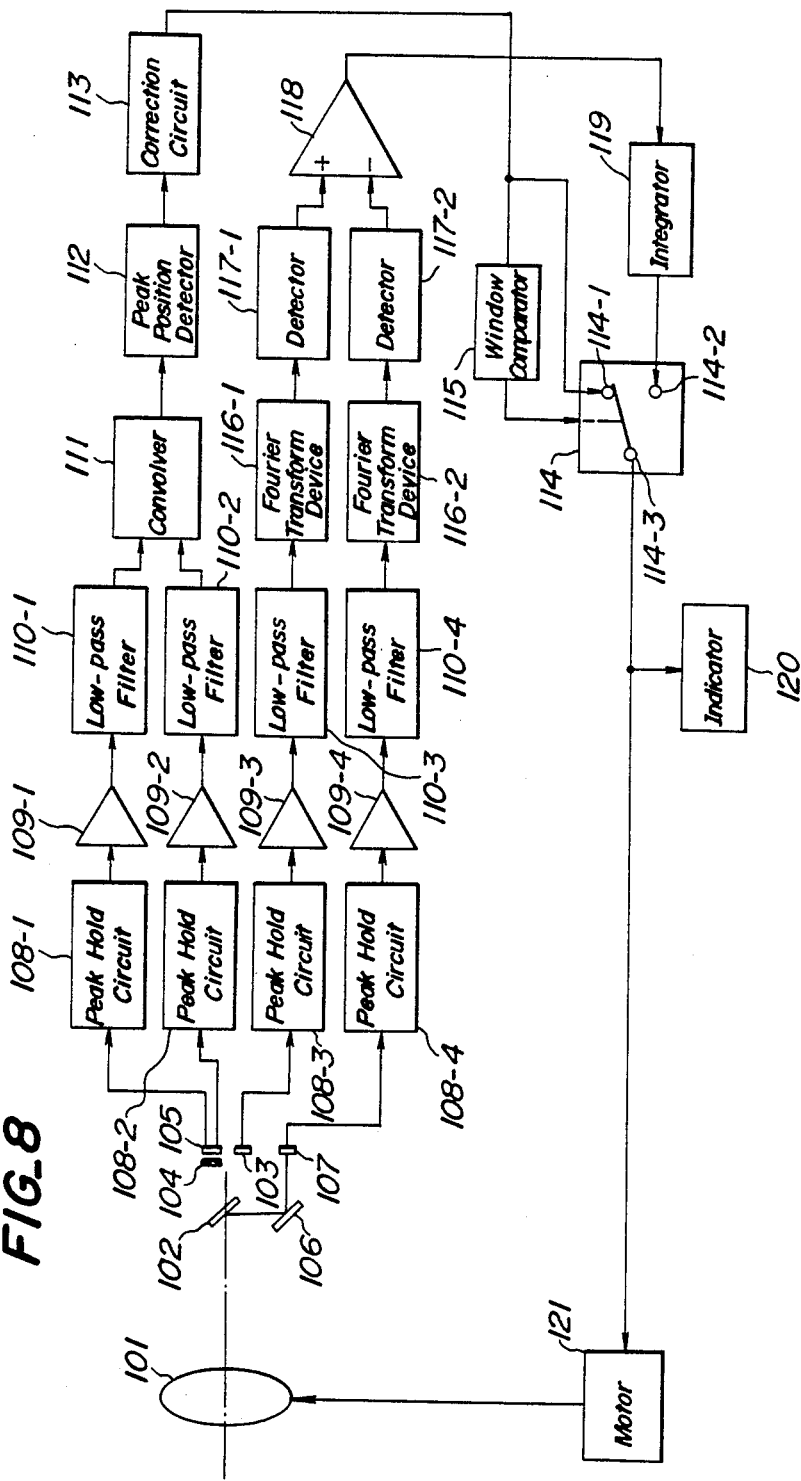

FIG. 8 is a schematic view showing still another embodiment of the focus detection apparatus for effecting the method according to the invention. In this embodiment, a part of a light flux transmitted through an imaging optical system 101 is divided into two light fluxes, one of which is made incident upon a line sensor 103 and also upon a line sensor 105 through a pupil dividing means 104 and the other of which is made incident upon a line sensor 107 via a reflection morror 106. The line sensors 103 and 107 are arranged apart from each other by the same distance forward and backward with respect to a predetermined focal plane of the imaging optical system 101 or a surface equivalent thereto, and the line sensor 105 is arranged on the same substrate on which the line sensor 103 is arranged. Moreover, an exit pupil of the imaging optical system 101 is divided into a first region and a second region which are arranged symmetrically with respect to an optical light axis by means of the pupil dividing means 104 such as the fly-eye lens array, the slit array and the prism array, and the light fluxes transmitted through the first and the second regions are alternately made incident upon successive light receiving elements in the line sensor 105. Under such a construction, contrasts of the images respectively formed on the line sensors 103 and 107 are made identical in case that the imaging optical system 101 is in the in-focus condition with respect to the image formed on the predetermined focal plane and in the de-focus condition one of which becomes high and the other low corresponding to the lateral shift direction. Moreover, in the line sensor 105, in the in-focus condition the image formed on a first group of the light receiving elements which receive the light fluxes transmitted through the first region is equal to the image formed on a second group of the light receiving elements, and in the de-focus condition these images are laterally shifted from each other corresponding to the de-focus direction.

In the line sensor 105, time series outputs of the first light receiving element group and the second light receiving element group are read out respectively in such a manner that, if it is assumed that the time duration of the time series signals derived from one group is 2T, the time duration of the time series signals from the other group becomes T at a timing shown in FIG. 2B. The time series signals thus derived are respectively supplied to a convolver 111 which utilizes the surface acoustic waves and has the interference length of 1.5T through peak hold circuits 108-1, 108-2, amplifiers 109-1, 109-2 and low-pass filters 110-1, 110-2. Further, an output of the convolver 111 is supplied to a peak position detector 112.

Now, it is assumed that outputs a(t), b(t) of the low-pass filters 110-1 and 110-2 are described as follows:

$$a(t) = f(t - t_0) \quad 0 < t < 2T$$
$$b(t) = f(t + t_0) \quad T/2 < t < 3/2T.$$

where f(t) represents the intensity distribution of the image and $t_0$ corresponds to a lateral shift amount $x_0$ between the images formed on the first and the second light receiving element groups. In this case, the output $R_{ab}(\tau)$ of the convolver 111 is described as follows:

$$R_{ab}(\tau) = \int a(t)b(\tau + t)dt \\ = \int f(t - t_0)f(\tau + t + t_0)dt.$$

Therefore, in response to the $t_0$ corresponding to the lateral shift amount $x_0$, the peak position of $R_{ab}(\tau)$ can be determined. As shown in FIG. 6, the peak position is varied linearly corresponding to the shift amount and direction, and appears in a range from 1.5T to 2T when the imaging optical system 101 is in the in-focus position with respect to the image formed on the light receiving surface of the line sensor 105 i.e. $x_0=0$. Therefore, the output of the peak position detector 112 becomes zero when the imaging optical system 101 is in the in-focus position with respect to the image formed on the light receiving surface of the line sensor 105 and has a polarity corresponding to the shift direction and a value corresponding to the shift amount in the de-focus condition.

In this embodiment, since the line sensor 105 is arranged forward with respect to the predetermined focal plane of the imaging optical system 101, the output of the peak position detector 112 is supplied to a correction circuit 113 so as to correct the output signal in such a manner that the output becomes zero when the imaging optical system 101 is in the in-focus position with respect to the image formed on the predetermined focal plane. Then, the output of the correction circuit 113 is supplied to one input terminal 114-1 of a switch 114 and is also supplied to a window comparator 115.

Moreover, the outputs of the line sensors 103 and 107 are read out simultaneously in parallel in the time series manner and the thus read out signals are respectively supplied to Fourier transform devices 116-1 and 116-2 each having the surface acoustic wave filter shown in FIGS. 1B and 1C through peak hold circuits 108-3, 108-4, amplifiers 109-3, 109-4 and low-pass filters 110-3, 110-4 so as to effect the Fourier transform. The thus transformed outputs are respectively supplied to detectors 117-1 and 117-2 so as to obtain the power spectra by effecting the AM detection, and then these power spectra are supplied to a differential amplifier 118 so as to detect the difference therebetween. The output of the differential amplifier 118 becomes, for example, negative when the imaging optical system 101 is in the forwardly de-focus condition with respect to the image formed on the predetermined focal plane, positive when the imaging optical system is in the backwardly de-focus condition and zero when the imaging optical system is in the in-focus condition. Further, the output of the differential amplifier 118 is integrated by an integrator 119 and is supplied to the other input terminal 114-2 of the switch 114.

In this embodiment, an output terminal 114-3 of the switch 114 is connected to the input terminal 114-1 when the output of the correction circuit 113 is out of the range predetermined in the window comparator 115, and is connected to the input terminal 114-2 when it is within the range. That is to say, until the output of the correction circuit 113 becomes within the range predetermined in the window comparator 115, the focus condition is indicated on an indicator 120 in response to the output and the imaging optical system 101 is driven by means of a motor 121. Further, when the output of the correction circuit 113 becomes within the range predetermined in the window comparator 115, the focus condition is controlled in response to the output of the integrator 119. In this manner, it is possible to control the focus condition always in the fast and accurate manner by changing the focus detection algorithm corresponding to the focus condition.

Figure 9:
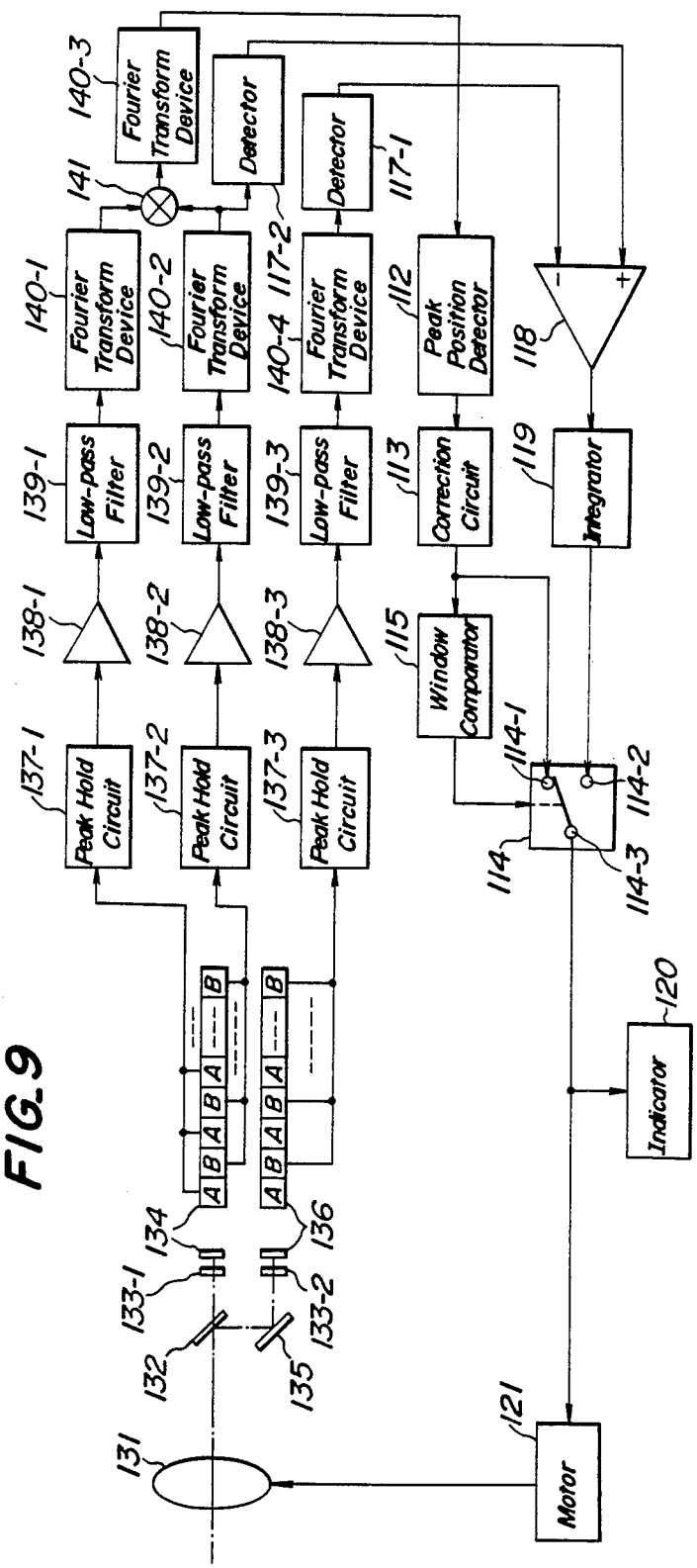

FIG. 9 is a schematic view showing still another embodiment of the focus detection apparatus for effecting the method according to the invention. In this embodiment, a part of the light flux transmitted through an imaging optical system 131 is divided into two light fluxes, one of which is made incident upon a line sensor 134 through a pupil dividing means 133-1 such as the fly-eye lens array, the slit array and the prism array, and the other of which is made incident upon a line sensor 136 via reflection mirror 135 and a pupil dividing means 133-2. The line sensors 134 and 136 are arranged forward and backward by the same distance with respect to the predetermined focal plane of the imaging optical system 131 or the surface equivalent thereto. The light fluxes transmitted through a first region and a second region of the exit pupil of the imaging optical system 131 are alternately made incident upon successive light receiving elements of respective line sensors by means of the pupil dividing means 133-1 and 133-2.

As shown in FIG. 9 by the plan view, the line sensor 134 comprises a first light receiving element group consisting of the light receiving elements which receive the light flux transmitted through the first region (shown by A in FIG. 9) and a second light receiving element group consisting of the light receiving elements which receive the light flux transmitted through the second region (shown by B in FIG. 9). The outputs of each light receiving element group are read out simultaneously in parallel in the time series manner, and are respectively supplied to Fourier transform devices 140-1, 140-2 which utilize the surface acoustic waves through peak hold circuits 137-1, 137-2, amplifiers 138-1, 138-2 and low-pass filters 139-1, 139-2 so as to effect the Fourier transform.

The respective time series signals thus transformed in the Fourier transform devices 140-1 and 140-2 are supplied to a multiplier 141 so as to derive the cross spectrum, and the thus obtained cross spectrum is further supplied to a Fourier transform device 140-3 so as to effect the Fourier transform. In this manner, as is the same as the embodiment shown in FIG. 8, it is possible to obtain the correlation function between the images formed in the respective light receiving element groups. After that, the output of the Fourier transform device 140-3 is supplied to the peak position detector 112 so as to detect the peak position, and is further supplied to the correction circuit 113. Therefore, it is possible to derive the focus information such that the signal representative of the focus condition becomes zero when the imaging optical system 131 is in the in-focus condition with respect to the predetermined focal plane, and has the polarity corresponding to the lateral shift direction and the value corresponding to the lateral shift amount in the de-focus condition. This focus information is supplied to one input terminal 114-1 of the switch 114 and also supplied to the window comparator 115, as is the same as the embodiment shown in FIG. 8.

Moreover, as shown by the plan view shown in FIG. 9, the light receiving elements in the line sensor 136 are read out from only one group, for example, the second light receiving element group in the time series manner, and are respectively supplied to a Fourier transform device 140-4 having the same construction as that of the Fourier transform devices 140-1 to 140-3 through a peak hold circuit 137-3, an amplifier 138-3 and a low-pass filter 139-3 so as to effect the Fourier transform. The output of the Fourier transform device 140-4 is supplied to the detector 117-1 so as to obtain the power spectrum by effecting the AM modulation, and the thus obtained power spectrum is supplied to one input terminal of the differential amplifier 118. The power spectrum of the second light receiving element group in the line sensor 134 i.e. the output of a detector 117-2 is also supplied to the other input terminal of the differential amplifier 118. Therefore, the polarity of the output of the differential amplifier 118 becomes, for example, negative when the imaging optical system 131 is forwardly de-focus condition, positive in case of backwardly de-focus condition and zero in case of in-focus condition. Further, the output of the differential amplifier 118 is integrated in the integrator 119 and is further supplied to the other input terminal 114-2 of the switch 114, and thus as is the same as the embodiment shown in FIG. 8 it is possible to effect the focus control always in the fast and accurate manner by changing the focus detection algorithm corresponding to the changing the focus detection algorithm corresponding to the focus condition.

The present invention is not limited to the embodiments mentioned above, but various alternatives and modifications are possible. For example, if the AM modulation is effected for the outputs of the line sensors 103 and 107 for using the image sharpness detection technique by means of the oscillator having a certain constant frequency, it is possible to effect the Fourier transform by using only one chirp filter shown in FIG. 1A instead of the Fourier transform devices 116-1 and 116-2.

Figure 10:
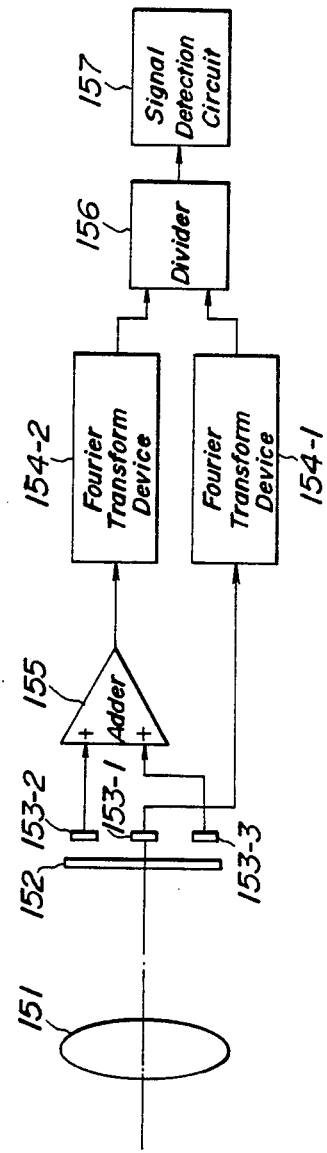

FIG. 10 is a schematic view showing still another embodiment of the focus detection apparatus for effecting the method according to the invention. In this embodiment, a light flux transmitted through an imaging optical system 151 is divided into three light fluxes, one of which is transmitted through a first region which is situated at a center thereof and the other of which are transmitted through second and third regions each having no-overlapped portions with the first region. Then, these three light fluxes are respectively made incident upon line sensors 153-1, 153-2, 153-3 each having the same number of elements. In this embodiment, if it is assumed that x is a position on the line sensor, intensity distributions f(x) of images formed on the line sensors 153-1 to 153-3 become identical with each other when the imaging optical system 151 is in the in-focus condition, and is laterally shifted with respect to each other corresponding to a de-focusing direction by $f(x+\Delta x)$ and $f(x-\Delta x)$ with respect to f(x) when the imaging optical system 151 is in the de-focus condition. The outputs of these line sensors 153-1 to 153-3 are read out simultaneously in parallel in the time series manner. Then, the thus read out output of the line sensor 153-1 is supplied to a Fourier transform device 154-1 having the surface acoustic wave filter so as to effect the Fourier transform, and the outputs of the line sensors 153-2 and 153-3 are supplied to an adder 155 and the output of the adder 155 is further supplied to a Fourier transform device 154-2. Moreover, the outputs of the Fourier transform devices 154-1 and 154-2 are supplied to a divider 156 and are further supplied to a signal detection circuit 157.

In the present embodiment, each output of the line sensors 153-1 to 153-3 is detected as a time-frequency signal wherein the position x corresponds to the time. Now, it is assumed that the outputs of the line sensors 153-1, 153-2 and 153-3 are respectively f(x), $f(x+\Delta x)$ and $f(x-\Delta x)$, $\Delta x$ i.e. the lateral shift amount of the intensity distribution between on the line sensor 153-1 and on the line sensor 153-2 or 153-3 corresponds to a distance to an object, and thus the focus condition can be derived from $\Delta x$. Here, an output signal $F(j\omega)$ of the Fourier transform device 154-1 is derived as follows: $F(j\omega) = \int f(x) e^{-j\omega x} dx$. Moreover, as to an output signal $G(j\omega)$ of the Fourier transform device 154-2, since an output signal g(x) of the adder 155 is described as follows: $g(x) = f(x+\Delta x) + f(x-\Delta x)$, the output signal $G(j\omega)$ is derived as follows if the length of each line sensor is long enough as compared with that of $\Delta x$:

$$\begin{aligned}G(j\omega) &= \int g(x) e^{-j\omega x} dx \\ &= \int f(x+\Delta x) e^{-j\omega x} dx + \int f(x-\Delta x) e^{-j\omega x} dx \\ &= e^{j\omega\Delta x} \int f(x) e^{-j\omega x} dx + e^{-j\omega\Delta x} \int f(x) e^{-j\omega x} dx \\ &= (e^{j\omega\Delta x} + e^{-j\omega\Delta x}) \int f(x) e^{-j\omega x} dx \\ &= 2\cos\omega\Delta x \int f(x) e^{-j\omega x} dx.\end{aligned}$$

Further, if $G(j\omega)$ is divided by $F(j\omega)$, an output thereof is described as follows:

$$\frac{G(j\omega)}{F(j\omega)} = 2\cos\omega\Delta x,$$

and this output is supplied to the signal detection circuit 157. Therefore, it is possible to derive the value and polarity of the output representing the shift amount and the shift direction respectively by detecting $\Delta x$.

In this case, since it is possible to effect the Fourier transform for the outputs of the line sensors 153-1 to 153-3 by means of the Fourier transform devices 154-1 and 154-2 which utilize the surface acoustic wave filter, it is possible to make the response speed of the focus information extremely fast and also to detect the focus condition always in an accurate manner.

Figure 11:
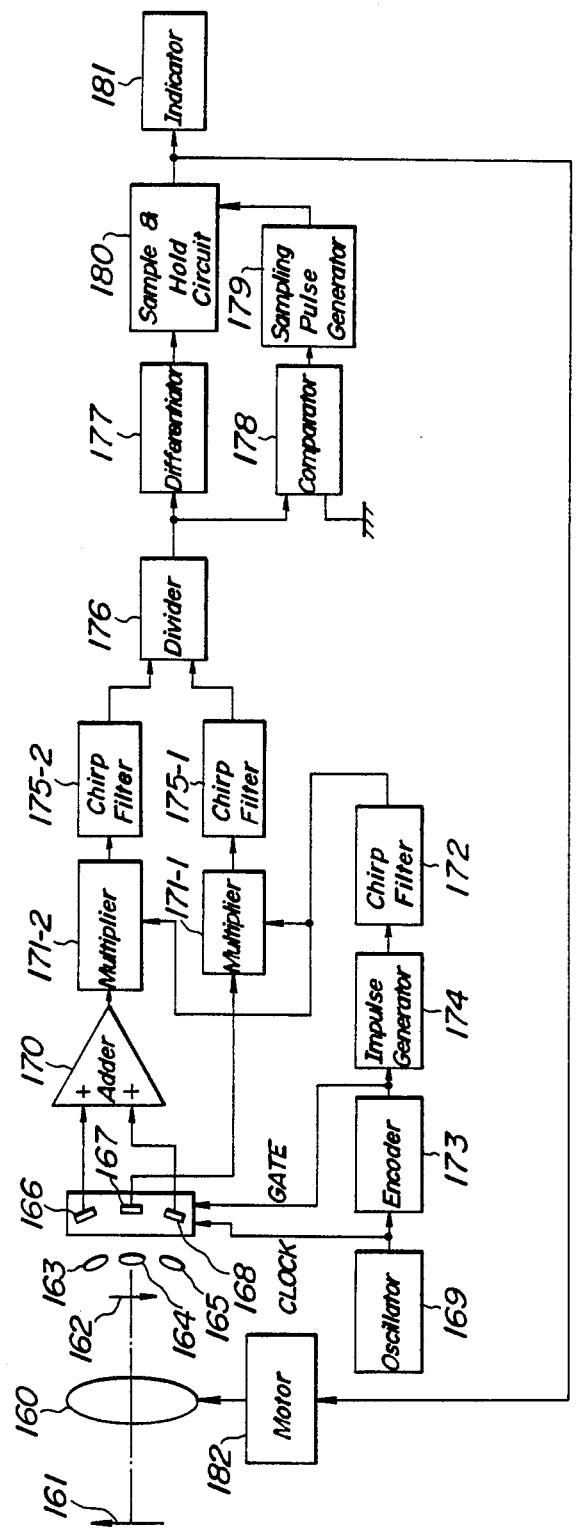

FIG. 11 is a schematic view showing still another embodiment of the focus detection apparatus which performs the method according to the invention. In this embodiment, the light flux transmitted through a part of an image 162 of an object 161 formed on the predetermined focal plane is further projected onto line sensors 166, 167 and 168 each having the same number of elements by means of sub lenses 163, 164 and 165. Here, the positions of the line sensors 166, 167 and 168 with respect to the sub lenses 163, 164 and 165 are determined in such a manner that, as explained in FIG. 10, if the position on the line sensor is assumed as x, intensity distributions of the images formed on these line sensors are made identical with each other when in the in-focus condition and the intensity distributions on the line sensors 166 and 168 are laterally shifted from each other corresponding to the de-focusing direction by $f(x+\Delta x)$ and $f(x-\Delta x)$ or $f(x-\Delta x)$ and $f(x+\Delta x)$ with respect to the intensity distribution f(x) when in the de-focus condition. That is to say, the light flux transmitted through the first region including an optical axis of the imaging optical system 160 is made incident upon the line sensor 167, and the light fluxes transmitted through the second and third regions are respectively made incident upon the line sensors 166 and 168. In this embodiment, the first, second and third regions in the exit pupil have almost the same dimension, and further the second and third regions are arranged symmetrically with respect to the optical axis.

Moreover, the outputs of the line sensors 166, 167 and 168 are read out simultaneously in parallel in the time series manner under the control of clock pulses generated from an oscillator 169, and the thus read out outputs of the line sensors 166 and 168 are supplied to an adder 170. In this embodiment, the output of the line sensor 167 and the output of the adder 170 are supplied to the Fourier transform device having the same construction as shown in FIG. 1C so as to effect the Fourier transform. That is to say, these outputs are respectively supplied to multipliers 171-1 and 171-2 so as to be multiplied with an up- or down-chirp signal supplied from a chirp filter 172. Therefore, pulse signals synchronized with a read out frequency of the line sensors 166 to 168 are generated by encoding the output of the oscillator 169 by means of an encoder 173 and then supplied to an impulse generator 174 so as to make the chirp filter 172 responsive to impulse. Further, the output of the encoder 173 is supplied to the line sensors 166 and 168 as a gate signal. The outputs of the multipliers 171-1 and 171-2 are respectively supplied to chirp filters 175-1 and 175-2 having the impulse response for inverse down- or up-chirp signal as that of the chirp filter 172 so as to effect the Fourier transform for the outputs of the line sensor 167 and the adder 170. The thus transformed outputs are divided by a divider 176 so as to obtain the signal representing $2 \cos \omega \Delta x$ as explained in FIG. 10.

In this embodiment, in order to detect the $\Delta x$, the output of the divider 176 is supplied to a differentiator 177 and also to one input terminal of a comparator 178. When the output of the divider 176 representing $2 \cos \omega \Delta x$ is supplied to the differentiator 177, a differential operation for this output signal is effected since $\omega$ corresponds to the time. Therefore, the output of the differentiator 177 is described as follows:

$$\frac{d}{d\omega}\left[\frac{G(j\omega)}{F(j\omega)}\right] = 2\Delta x(-\sin\omega\Delta x).$$

Figure 12:
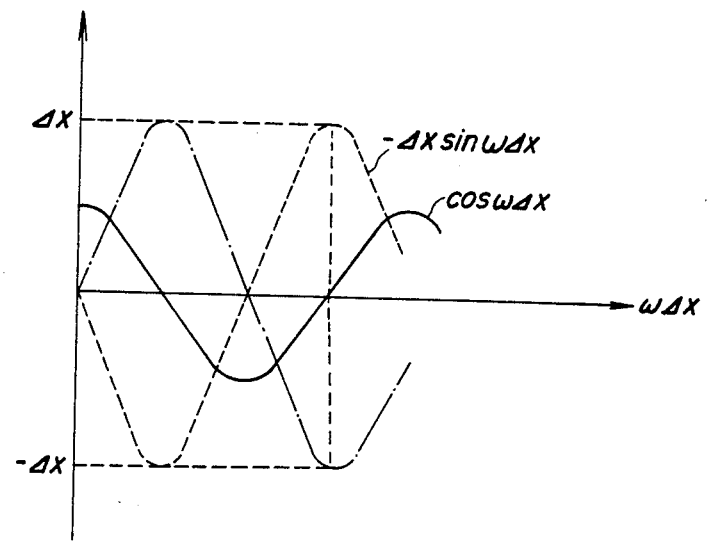
FIG. 12 is a graph for explaining operation of the focus detection apparatus shown in FIG. 11.

In this case, since $-\sin \omega \Delta x$ is an odd function, a phase of this output is inverted as shown by a dotted line and a one-dotted chain line in FIG. 12. Therefore, this output becomes "1" when a condition that $\omega \Delta x = 2(n+\frac{3}{4})\pi$: n is an integral number and $\Delta x > 0$ is achieved and also becomes "$-1$" when a condition that $\omega \Delta x = 2(n+\frac{3}{4})\pi$: n is an integral number and $\Delta x < 0$ is achieved. In addition, if the outputs of the differentiator 177 are sampled at the point $\omega \Delta x = 2(n+\frac{3}{4})\pi$, the lateral shift amount and direction can be derived from the value and polarity of $\Delta x$. In this embodiment, zero-cross points of the output of the divider 176 i.e. $2 \cos \omega \Delta x$ are detected in the comparator 178 and are supplied to a sampling pulse generator 179. Then, the sampling pulse is generated by the sampling pulse generator 179 at the zero-cross point wherein the polarity of $2 \cos \omega \Delta x$ is changed from negative to positive. Under the control of the thus generated sampling pulses, the output of the differentiator 177 is sampled and held by a sample and hold circuit 180. Further, the output of the sample and hold circuit 180 is supplied to an indicator 181 so as to indicate the focus condition and is also supplied to a motor 182 so as to move the imaging optical system 160 into the focus position automatically. In this case, the movement of the imaging optical system 160 may be performed by a manual operation with reference to the focus information indicated on the indicator 181.

In the embodiment mentioned above, since it is possible to detect the de-focusing amount and direction corresponding to $\Delta x$ i.e. the distance to the object by a simple circuit construction on real time, it is possible to make the response speed of the focus information extremely high and is also possible to detect the focus conditions always in an accurate manner. In addition, the whole apparatus can be made small in size.

Figure 13:
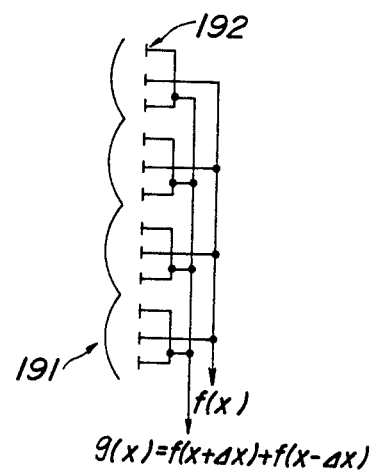
FIG. 13 is a schematic view showing another embodiment of a pupil dividing means according to the invention.

The present invention is not limited to the embodiments mentioned above, but various alternatives and modifications are possible. For example, in FIG. 11, use may be made of a two-dimensional sensor instead of the line sensors 166 to 168 so as to derive a two-dimensional map representing an absolute distance on the object. In this case, it is possible to perform a so-called dynamic focusing operation wherein the in-focus range is widened while the resolution is kept high. Moreover, in order to divide the exit pupil of the imaging optical system, use may be made of the fly-eye lens array 191 and a plurality of components of three light receiving elements 192 which receive respectively the light fluxes transmitted through the first, second and third regions corresponding to each fly-eye lens, as shown in FIG. 13. In this case, the intensity distribution f(x) can be obtained by reading out in series the light receiving element in each of the components which receive the light flux transmitted through the first region. Moreover, if the sum of two light receiving elements which receive the light fluxes transmitted through the second and third regions is read out in series, the sum of intensity distributions can be obtained from an equation $h(x)=f(x+\Delta x)+f(x-\Delta x)$.

What is claimed is:

1. A method for detecting a focus condition of an imaging optical system comprising the steps of:
   receiving at least a part of an image formed by an imaging optical system by means of at least one light receiving element array comprising a plurality of light receiving elements which produce element array output signals;
   processing the element array output signals of said at least one light receiving element array in real time by means of at least one processing device including at least one surface acoustic wave device to produce a device output signal; and
   detecting the focus condition of said imaging optical system from said device output signal.

2. A method according to claim 1, wherein the improvement further comprises the step of:
   arranging first and second light receiving element arrays forward and backward with respect to a predetermined focal plane of the imaging optical system, the first and second light element arrays producing first and second element array output signals;
   processing the first and second element array output signals by first and second processing devices, respectively, to produce first and second processing device output signals each representing an image sharpness; and
   detecting the focus condition of said imaging optical system in response to a difference between said first and second processing device output signals.

3. A method according to claim 2, wherein said processing the first and second element array output signals comprises effecting a Fourier transform for the first and second element array output signals to obtain first and second power spectra, and deriving said first and second processing device output signals from the first and second power spectra, respectively.

4. A method according to claim 3, wherein said Fourier transform effecting step comprises, amplitude-modulating the first and second element array output signals to generate first and second modulated signals, respectively; passing the first and second modulated signals through first and second chirp filters, each including at least one surface acoustic wave device, to derive first and second Fourier transform signals, respectively; and demodulating the first and second Fourier transform signals of the first and second chirp filters, respctively to derive first and second demodulated signals.

5. A method according to claim 4, wherein said detecting step comprises deriving a difference between the first and second demodulated signals and intergrating the difference to produce a focus detection signal representing the focus condition.

6. A method according to claim 2, wherein the improvement further comprises the steps of:
arranging third and fourth light receiving element arrays apart from each other forward and backward with respect to the predetermined focal plane of the imaging optical system by a distance larger than a distance by which the first and second light receiving element arrays are apart from each other, the third and fourth light element arrays producing third and fourth element array output signals;
processing the first and second element array output signals to produce a fine focus detection signal;
processing the third and fourth element array output signals by means of third and fourth processing devices each including at least one surface acoustic wave device to produce a coarse focus detection signal; and
selecting one of said fine and coarse focus detection signals in response to the focus condition to effect a focus adjustment.

7. A method according to claim 6, wherein said selection of the fine and coarse focus detection signals is effected in accordance with an amplitude of the coarse focus detection signal.

8. A method according to claim 1, wherein the improvement further comprises the steps of
arranging first and second light receiving element arrays which receive respectively light fluxes transmitted through first and second regions of an exit pupil of said imaging optical system, the first and second light receiving element arrays producing first and second element array output signals;
processing the first and second element array outputs signals by means of the same processing device to produce a correlation output signal representing an amount and direction of lateral shift between said light fluxes; and
detecting the focus condition of said imaging optical system in response to said correlation output signal.

9. A method according to claim 8, wherein said first and second array output signals are supplied to a convolver including a surface acoustic wave device at a given timing to produce the correlation output signal.

10. A method according to claim 9, wherein each of the first and second element array output signals is supplied to said convolver through a peak hold circuit and a low-pass filter.

11. A method according to claim 10, wherein the focus condition of the imaging optical system is detected by processing the correlation output signal of the convolver by a peak position detector.

12. A method according to claim 8, wherein said processing the first and second element array output signals comprises supplying the first and second element array output signals to first and second Fourier transform devices, respectively, each comprising chirp filters and each including at least one surface acoustic wave device; multiplying outputs of the first and second Fourier transform devices to produce a cross spectrum; and supplying the cross spectrum to a third Fourier transform device comprising chirp filters each inlcuding at least one surface acoustic wave device to derive the correlation output signal.

13. A method according to claim 12, wherein the first and second element array output signals are supplied to said first and second Fourier transform devices through first and second peak hold circuits and first and second low-pass filters, respectively.

14. A method according to claim 13, wherein the focus condition of the imaging optical system is detected by processing the correlation output signal of the third Fourier transform device by a peak position detector.

15. A method according to claim 1, wherein the improvement further comprises the steps of:
arranging first, second and third light receiving element arrays which receive respectively light fluxes transmitted through first, second and third regions of an exit pupil of said imaging optical system, said first region being arranged at a center including an optical axis and said second and third regions being arranged on respective sides of the first region, the first, second and third light element arrays producing first, second and third element array output signals;
supplying the first element array output signals to a first Fourier transform device comprising chirp filters each including at least one surface acoustic wave device to produce first transform output signals;
supplying a sum of the second and third element array output signals to a second Fourier transform device comprising chirp filters, each including at least one surface acoustic wave device, to produce second transform output signals;
supplying the first and second transform output signals to a divider to produce a divider output signal;
processing the divider output signal to produce a correlation output signal representing an amount and a direction of lateral shift of the light fluxes; and
detecting the focus condition of said imaging optical system in response to said correlation output signal.

16. A method according to claim 15, wherein said processing of the divider output signal comprises supplying said divider output signal to a differentiator to produce a differentiated output, and supplying said differentiated output to a sample and hold circuit to produce the correlation output signal.

17. A method according to claim 1, wherein the improvement further comprises the steps of arranging first and second light receiving element arrays forward and backward with respect to a predetermined focal plane of the imaging optical system, and third and fourth light receiving element arrays which receive respectively light fluxes transmitted through first and second regions of an exit pupil of the imaging optical system, the first, second, third and fourth light receiving element arrays producing first, second, third and fourth element array output signals;

processing the first and second element array hirput signals by first and second processing devices each including at least one surface acoustic wave device to produce a first correlation output signal representing an image sharpness, and processing the third and fourth element array output signals by third and fourth processing devices each including at least one surface acoustic wave device to produce a second correlation output signal representing an amount and direction of lateral shift between said light fluxes;

selecting one of the first and second correlation output signals; and detecting the focus condition of said imaging optical system in response to the selected correlation output signal.

18. A method according to claim 17, wherein said third and fourth element array output signals are supplied to a convolver including at least one surface acoustic wave device at a given timing to produce the second correlation output signal.

19. A method according to claim 17, wherein said processing of the third and fourth element array output signals comprises supplying the third and fourth element array output signals to first and second Fourier transform devices, respectively, comprising chirp filters each including at least one surface acoustic wave device; multiplying outputs of the first and second Fourier transform devices to produce a cross spectrum; and supplying the cross spectrum to a third Fourier transform device comprising chirp filters each including at least one surface acoustic wave device to derive said second correlation output signal.

20. A method according to claim 17, wherein said selection of the first and second correlation output signals is effected in accordance with an amplitude of the second correlation output signal.

21. A method according to claim 17, wherein said processing of the first and second element array output signals comprises, effecting a Fourier transform for each of the first and second element array output signals to produce first and second power spectra; and calculating a difference between said first and second power spectra to obtain said first correlation output signal representing the image sharpness.

* * * * *